Figure 1:
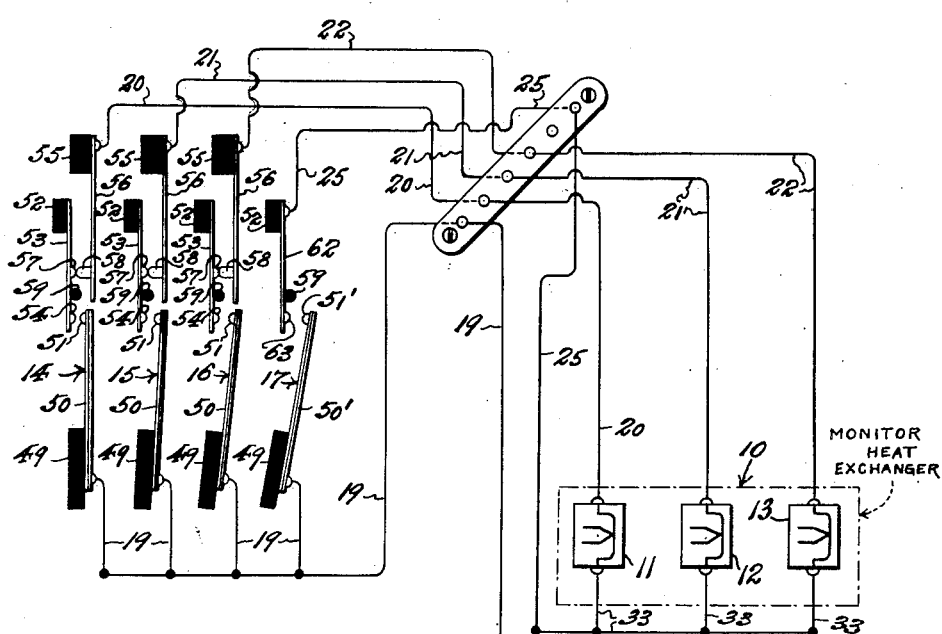

May 19, 1953     A. H. CUBBERLEY     2,639,095
HEATING CONTROL SYSTEM
Filed Sept. 23, 1949     2 Sheets-Sheet 1

INVENTOR.
Amariah H. Cubberley
BY George D. Richards
Attorney

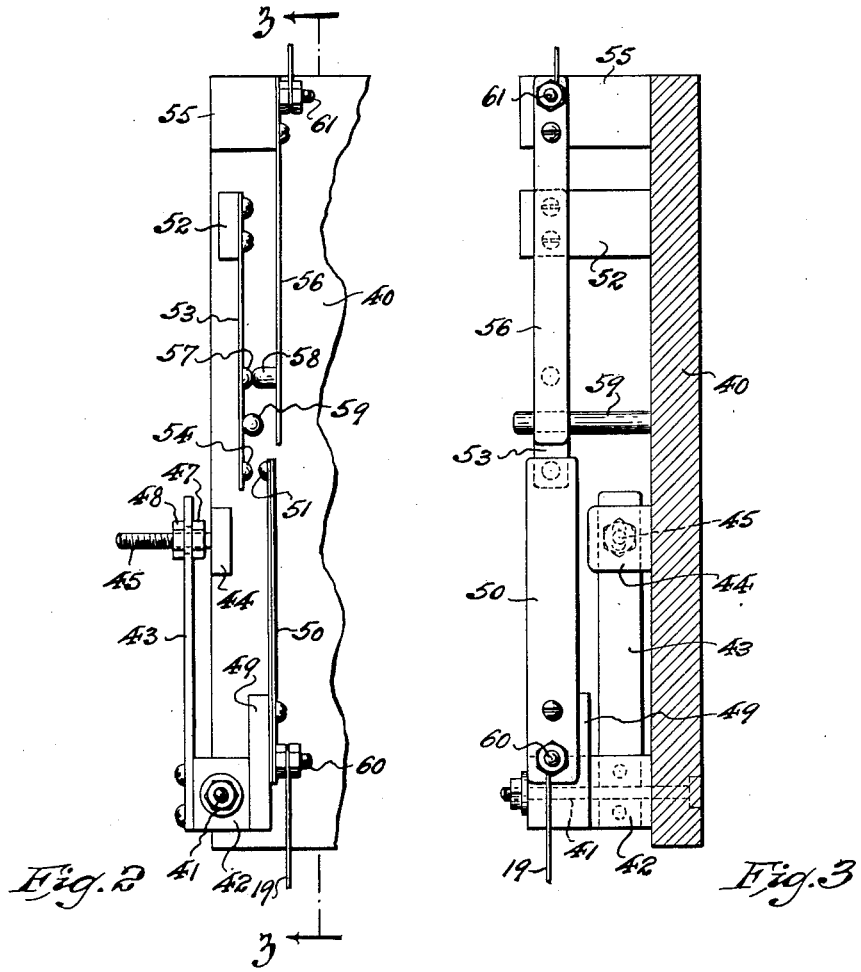

Patented May 19, 1953

2,639,095

UNITED STATES PATENT OFFICE 2,639,095

HEATING CONTROL SYSTEM

Amariah H. Cubberley, Belleville, N. J.

Application September 23, 1949, Serial No. 117,348

3 Claims. (Cl. 236—37)

This invention relates to improvements in means for thermal control of heating systems that is responsive to outdoor temperature variation.

The purpose of this invention is to provide in a heat transfer system, including heat exchangers which are supplied with a heating medium from a generating source, control means therefor which includes a plurality of circuits adapted to selectively actuate electrical means for governing the generation and admission of a supplied heating medium to the heat exchangers of the heat transfer system, whereby part or parts or the whole of the capacity of said heat exchangers can be selectively brought into and out of service accordingly as outdoor temperature drops or rises; said circuits including thermostatic means, exposed to and responsive to outdoor temperature, for automatically and selectively rendering said circuits operative.

The invention has for a further object to provide, in a thermal control means for heating systems of the kind referred to, a plurality of thermostatic switching devices for the selector circuits adapted to be installed outdoors, and which are respectively subject to operation under different ranges of outdoor temperature, and which are adapted to be so adjusted for successive operation from one temperature range to another that an operative switching device which is responsive to one temperature range will not become inoperative until the switching device which is responsive to a succeeding temperature range becomes operative, i. e. a lap of a predetermined number of degrees between successive temperature ranges will assure that both switching devices, respectively responsive to said successive temperature ranges, will be operative during the lapping temperature degrees of said ranges, and consequently no break or interruption in the operation of the thermal control means can occur at any time.

Another object of this invention is to provide a thermal control means of the kind referred to which is adapted to operate in conjunction with day and night room thermostats, including a cooperative day and night program clock if desired, through a common relay means by which a heat source operating means is governed.

Other objects of this invention, not at this time more particularly enumerated, will be understood from the following detailed description of the thermal control means, taken in connection with the accompanying drawings in which:

Fig. 1 is a diagrammatic showing of the thermal control system of this invention; Fig. 2 is a fragmentary face or plan view of a thermostatic switching device for outdoor installation subject to influence of outdoor temperature; and Fig. 3 is a longitudinal sectional view, taken on line 3—3 in Fig. 2.

The thermal control means of this invention is designed for use with a heat source or generator having a heating medium output capacity sufficient to heat the building served thereby in the coldest weather likely to occur in the region in which the building is located. As a consequence of this, the heat generator, in order to have sufficient capacity for adequate heat supply during occurrence of the few extremely cold periods, will be approximately double the size necessary for heat supply in moderately cold weather, and greatly over size for heat required in mild weather. In view of this, the instant invention is designed to provide a novel thermal control means which will automatically and constantly operate to selectively use more or less of the heat generator capacity accordingly as changes in outdoor temperature occur, and which prevents room temperature from overriding, thus attaining very substantial economy in the heat generation and supply operation. Under the novel system of the present invention, this is accomplished by providing in connection with a control or monitor heat exchanger within the building, or in each of a plurality of zones within the building, a plurality of devices which will selectively operate the exchanger at part or parts or the whole of its capacity; e. g. will open or close the exchanger to admission of heating medium with respect to $\frac{1}{3}$, $\frac{2}{3}$ or the whole of its capacity. The operation of said devices which determine the proportion of the monitor heat exchanger to be utilized is selectively and automatically carried out by the individual actuating circuits therefor which are each controlled by a thermostatic switching device. The respective thermostatic switching devices are adapted to be located outdoors so as to be respectively responsive to different ranges of outdoor temperature variation. The capacity selector devices of the monitor heat exchanger are adapted to be electrically connected in series and so as to operate in conjunction with any conventional type of day and night room thermostats, including a cooperative day and night program clock if desired. The thermal control means thus characterized is electrically connected with a suitable conventional transformer relay for current service; which relay also serves to connect the thermal control means with any suitable means for managing the operation of the heat generator in accordance with such demands thereon as are determined by the operation of the thermal control means.

Referring now to Fig. 1 of the drawings, the reference character 10 indicates a monitor heat exchanger or radiator which, by way of example, is shown as provided with a plurality of capacity selector devices adapted to be electrically actuated, and comprising a capacity selector device 11 which, when actuated, functions to shut off admission of heating medium to the radiator 10 when ⅓ of its capacity is in use, a second capacity selector device 12 which, when actuated, functions to shut off admission of heating medium to the radiator 10 when ⅔ of its capacity is in use, and a third capacity selector device 13 which, when actuated, functions to shut off admission of heating medium to the radiator 10 when the whole or ⅗ of its capacity is in use.

An outdoor thermostatic switch means, by which the capacity selector devices of the monitor heat exchanger or radiator 10 are controlled, comprises a series of thermostatic switches 14, 15 and 16, the detail construction of which will be subsequently herein more fully described. Said outdoor thermostatic switch means also includes a thermostatic switch 17 for a circuit arranged to by-pass the capacity selector devices of the monitor heat exchanger or radiator 10.

Current service to the outdoor thermostatic switch means is supplied through a suitable transformer relay 18 which is connected to the thermostatic switches 14, 15, 16 and 17 by current wires 19.

The thermostatic switch 14 is connected to one side of the capacity selector device 11 of radiator 10 by circuit wires 20; thermostatic switch 15 is connected to one side of the capacity selector device 12 of radiator 10 by circuit wires 21; and thermostatic switch 16 is connected to one side of the capacity selector device 13 of radiator 10 by circuit wires 22.

A night room thermostat 23 and a day room thermostat 24 are provided for use in conjunction with the thermal control means. The outdoor thermostatic switch 17 is connected through circuit wires 25 to one side of each room thermostat 23 and 24. Preferably, but not necessarily, the room thermostats 23 and 24 are automatically and selectively cut into and out of service at selected times by a day and night program clock 26, one terminal 27 of which is connected with the opposite side of the night room thermostat 23 through circuit wire 28, and another terminal 29 of which is connected with the opposite side of the day room thermostat 24 through circuit wire 30. The circuit is completed through the clock switch arm 31 back to relay 18 through the return circuit wire 32. The capacity selector devices 11, 12 and 13 are each connected in series with the room thermostats 23 and 24 through circuit wires 33 which join the current input circuit wire 25 leading to said room thermostats.

The relay 18 is adapted to serve, under control conditions established from time to time by the thermal control means, actuating current to suitable operating control means for the heat generator (not shown), in manner already well known to the art.

The outdoor thermostatic switch means, which is an important and novel feature of this invention, in one illustrative embodiment thereof as shown, comprises a base 40 upon which the several thermostatic switches 14, 15, 16 and 17 are mounted. Each thermostatic switch 14, 15 and 16 comprises the following construction and relation of parts. Pivotally journaled on a fulcrum stud or bolt 41, which extends outwardly from the base 40, is a hub block 42, to the outer side of which is suitably affixed an upwardly extending adjusting lever 43. Spaced above the hub block 42 is an upstanding post 44 which is also affixed to the base 40. Extending outwardly from the post 44 is a screw-threaded stud 45. This stud 45 extends through a slot 46 with which the free end portion of the adjusting lever 43 is provided, and threaded on said stud, to respectively engage opposite faces of the adjusting lever 43, are adjusting nuts 47 and 48. Suitably affixed to the inner side of the hub block 42 is a bracket plate 49 made of suitable electrical insulation material. Affixed to said bracket plate 49, to extend upwardly therefrom, is a thermostatic switch blade 50 of the bimetallic type, the same being provided adjacent its free end with a contact point 51. Upstanding from the base 40 is a supporting member 52 made of electrical insulation material, and which is located so as to be suitably upwardly spaced from the thermostatic switch blade 50. Affixed to the supporting member 52, to depend therefrom, is a resiliently flexible metallic make and break switch blade 53, which is so disposed that its free end portion is opposed to the free end portion of said thermostatic switch blade 50, and which is provided with a contact point 54 opposed to and engageable, at proper times, by the contact point 51 of said thermostatic switch blade 50. Also upstanding from the base 40 is another supporting member 55 likewise made of electrical insulation material. Affixed to this supporting member 55, to depend therefrom in normal parallel and spaced apart relation to the inner face of the make and break switch blade 53, is a resiliently flexible metallic terminal switch blade 56. The resiliency of the make and break switch blade 53 is such as to yieldably bias the same toward the terminal switch blade 56, and the resiliency of the latter is such as to yieldably bias it toward the make and break switch blade 53. These switch blades 53 and 56 are respectively provided with contact points 57 and 58 which are opposed and normally in mutual contact. Affixed to the base 40 is an upstanding stop member 59 made of electrical insulation material, and so located as to lie intermediate the make and break switch blade 53 and the terminal switch blade 56, but so as to be normally spaced a suitable distance away from the free end portion of the latter. An input circuit wire is connected by binding post 60 or other suitable connection to the thermostatic switch blade 50. To the terminal switch blade 56 is connected an appropriate output circuit wire by means of binding post 61 or other suitable connection.

The outdoor thermostatic switch means also includes the thermostatic switch 17 which comprises an adjustably mounted thermostatic switch blade 50' corresponding in structure and arrangement to the adjustable thermostatic switch blades of the switch devices 14, 15 and 16 as above described. The thermostatic switch 17 includes a single terminal switch blade 62 which is dependent from an upstanding supporting member 52 made of electrical insulation material. The free end portion of said terminal switch blade 62 is opposed to the free end portion of the thermostatic switch blade 50', and these switch blades are provided with respective opposed contact points 63 and 51' adapted to engage at proper times. An input circuit wire is suitably connected with the thermostatic switch blade 50', and an output circuit wire is suitably connected with the terminal switch blade 62.

Assuming, for example, that no demand upon the heat source will be required when outdoor temperature is above 67° F., the several thermostatic switches 14, 15, 16 and 17 of the outdoor thermostatic switch or control means will be so adjusted that all remain open at outdoor temperature above 67° F. The said thermostatic switches 14, 15, 16 and 17 are respectively adjusted to successively close as outdoor temperature drops through predetermined successive ranges below 67° F. For example, switch 14 is adjusted to close and remain closed through an outdoor temperature drop range from 67° F. to 46° F.; switch 15 is adjusted to close and remain closed through an outdoor temperature drop range from 49° F. to 28° F.; switch 16 is adjusted to close and remain closed through an outdoor temperature drop range from 31° F. to 10° F.; and switch 17 is adjusted to close and remain closed at all outdoor temperatures below 13° F.

The adjustment of said switches 14 to 16 can be effected by setting their thermostatic switch blades 50 at various normal initial predetermined distances from the make and break switch blades 53 with which they cooperate; and in the case of the thermostatic switch blade 50' of switch 17, the same is adjustably initially spaced relative to the terminal switch blade 62 with which it cooperates. It will be understood that the thermostatic switch blades will flex in switch closing direction under the contracting effect of cold thereupon. Desired adjustment of the thermostatic switch blades is accomplished by moving the adjusting levers 43 so as to rotate the hub blocks 42, and thus shift the thermostatic switch blades so as to initially space the free end portions of the same the required distance from the switch blades to be engaged thereby; all whereby the circuit closing engagement or contact of these switch blades will be made when the selected degree of outdoor temperature occurs.

In the operation of the system, when outdoor temperature drops to 67° F., the thermostatic switch blade 50 of switch 14 will have flexed an amount sufficient to carry its contact point 51 into circuit closing engagement with contact point 54 of the cooperative make and break switch blade 53. When this occurs, current will flow through input line 19 to and through said switch blades 50 and 53, thence through engaged contact points 57 and 58 to terminal switch blade 56, and thence through circuit wire 20 to capacity selector device 11 of the monitor radiator 10, the circuit being completed through a room thermostat 23 or 24, as the case may be. If, under these circumstances, the operative room thermostat is calling for heat, the capacity selector device 11 will operate to shut off supply of heating medium to the monitor radiator 10 when, in the illustrative case, ⅓ of the capacity of the latter is heated. The monitor radiator 10 will be automatically controlled at such ⅓ capacity by the selector device 11 and the operative room thermostat throughout a range of outdoor temperature drop from 67° F. to 46° F. When the outdoor temperature drops to 46° F., the thermostatic switch blade 50 of switch 14 will have flexed to a degree sufficient to outswing the make and break switch blade 53 and the following terminal switch blade 56 to a point where further movement of the latter is arrested by the opposed stop member 59, so that further flexing of the thermostatic switch blade 50 will be transmitted to the make and break switch blade 53 whereby to separate the contact points 57 and 58, and thus interrupt flow of current through switch 14 to the capacity selector device 11 of the monitor radiator. In the meantime, however, since switch 15 is set to close at an outdoor temperature drop to 49° F., said switch 15 will close before switch 14 opens, there being, in the illustrative case, a three degree lap between the closing of switch 15 and the opening of switch 14.

It will be understood that since the structure of the respective thermostatic switches 14, 15 and 16 is the same, as indicated by the identification of corresponding parts thereof by like reference characters, therefore the mode of operation thereof in closing and opening is likewise the same.

Upon the closing of switch 15, if the operative room thermostat is calling for heat, current will flow to the capacity selector device 12 through the circuit wires 21, whereupon said capacity selector device becomes operative to shut off supply of heating medium to the monitor radiator 10 when ⅔ of its capacity is heated. The monitor radiator will now be automatically controlled at such ⅔ capacity by the selector device 12 and the operative room thermostat through a range of outdoor temperature drop from 46° F. to 28° F.

When the outdoor temperature drops to 28° F., switch 15 will open and thus interrupt flow of current therethrough to the capacity selector device 12 of the monitor radiator 10. In the meantime, since the switch 16 is set to close at 31° F., said latter switch will close before switch 15 opens due to the lap of three degrees F. outdoor temperature between such operations.

Upon the closing of switch 16, if the operative room thermostat is calling for heat, current will flow to the capacity selector device 13 through the circuit wires 22, whereupon said capacity selector device becomes operative to shut off supply of heating medium to the monitor radiator when the whole of the capacity thereof is supplied, i. e., when 3/3 thereof is heated. The monitor radiator 10 will thereupon be automatically controlled at full capacity by the selector device 13 and the operative room thermostat throughout a range of outdoor temperature drop from 31° F. to 10° F.

When the outdoor temperature drops to 10° F., switch 16 will open, but in the meantime switch 17 will close at outdoor temperature of 13° F., and will remain closed at all outdoor temperatures below 13° F. Under these circumstances, the capacity selector devices 11, 12 and 13 of the monitor radiator 10 will be by-passed and thus remain open, so that full capacity of the radiator is constantly supplied with heating medium under the control of an operative room thermostat to which current directly passes from the closed switch 17 through the circuit wires 25.

The capacity selector devices 11, 12 and 13 may be of selected known type best suited to the character of the heat source and heating medium supplied thereby; e. g. such as thermostat, airstat, aquastat or other appropriate type. In a steam system, applicant has found satisfactory devices for the purpose to be strap-on surface type mercury switch aquastats, such as manufactured by the Minneapolis-Honeywell Co. In operation these capacity selector devices will function to interrupt current flow to the heat source control means, whereby to shut off heat source operation and supply of heating medium therefrom when that portion of the capacity of the monitor radiator selected thereby is heated to desired maximum degree, but will close again if said selected portion of the radiator cools down a predetermined amount, e. g. to a drop of 16° F., so that thereupon the heat source resumes operation and supply of heating medium to the radiator. Said capacity selector devices are subject to variation in arrangement and as to radiator temperature response; e. g. one satisfactory setting is such that heat is shut off by opening of the devices in response to a rising temperature to 120° F. in the selected portion of the radiator, and reclosing of the devices in response to a temperature drop to 104° F. for resumption of heat supply to the radiator.

Due to the overlapping between the opening and closing of the several switches 14, 15, 16 and 17 of the outdoor thermostatic control means, it will be obvious that some part of the latter is closed throughout the twenty-four hours of the day when outdoor temperature remains at 67° F. or below. Above 67° F. the outdoor thermostatic control means is inactive, i. e. all its switches remain open.

From the above it will be understood that whenever an operative room thermostat is satisfied the heat source will be shut off and will stay shut off until said room thermostat again calls for heat. However, when heat comes on, it will stay on only until that portion of the capacity of the monitor radiator, as selected by the controlling outdoor thermostaitc switch means operating through a given capacity selector device, has become heated to the desired maximum degree. When the heat source is shut off after the selected portion of the monitor radiator is so heated, heating medium will not again be supplied to the radiator until it has cooled down a predetermined amount and providing the operative room thermostat calls for heat. In extremely cold weather switch 17 of the outdoor thermostatic control means closes and delivers current directly to and through an operative room thermostat, and, under such circumstances, the heat source is not shut off until said room thermostat is satisfied regardless of the temperature of the monitor radiator.

Although, for the purpose of illustration, the outdoor thermostatic control means has been shown and described as comprising three thermostatic switches respectively corresponding to three different proportions of the monitor radiator capacity to be brought into service according to selected ranges of outdoor temperature drop, it will nevertheless be understood that said outdoor thermostatic control means may comprise more or less than three such thermostatic switches adapted to be set for response to various selected steps or ranges of outdoor temperature drop.

It will be understood that the monitor radiator can be so connected with or related to a plurality of radiators in a building, or in a given zone of a building, as to operate the latter radiators in correspondence to the controlled operation of said monitor radiator.

Although this invention has been above described as related to its use in a heating system, it will be further understood that, so far as the outdoor thermostatic control means is involved, it can also be used for automatic control of an air conditioning system in a building or in zones of the building. In such case the outdoor thermostatic control means can be used for controlling the operation of air conditioning apparatus so as to obtain graduated cooling effects in response to outdoor temperature conditions. In such use, as many suitably located indoor thermostats as may be desired or required can be installed in the building interior, and a differential maintained between indoor and outdoor temperatures by the use and operation of the outdoor thermostatic control means having a desired number of switches respectively responsive to various selected steps or ranges of outdoor temperature rise.

Having now described my invention, I claim:

1. In a heat control system, in combination, a heat exchanger means within indoor space to be heated, thermostatic selector devices for said heat exchanger means operative to determine use of various proportions of the capacity of the latter, thermostatic control means responsive to outdoor temperature comprising a plurality of thermostatic switches respectively connected in series with respective thermostatic selector devices of the heat exchanger means, means to relatively adjust said switches so that the same respectively respond to different successive ranges of outdoor temperature drop, whereby to selectively condition said thermostatic selector devices of the heat exchanger means for operation, said thermostatic selector devices and outdoor thermostatic control means being electrically connected in circuit with means for actuating a heat supplying means, said circuit including room thermostatic means located within the space to be heated remote from the heat exchanger means and connected in series with said thermostatic selector devices of the latter, and said outdoor thermostatic control means including an additional thermostatic switch, responsive to extreme low outdoor temperatures, and directly connected in said circuit in series with said room thermostatic means so as to by-pass the thermostatic selector devices of the heat exchanger means, whereby to operate the heat supplying means solely under control of said room thermostatic means.

2. In a building interior heating system having a generating source of heating medium together with electrical means for governing the operation of said generating source, a heat exchanger means to which the heating medium is supplied, thermostatic selector devices cooperative with the heat exchanger means for determining use of selected proportions of the capacity thereof, said devices being operative to shut off operation of the generating source and supply of heating medium to the heat exchanger means when selected used capacity of the latter is heated to a predetermined maximum temperature and to renew operation of said generating source of supply of heating medium when the heat exchanger temperature drops to a predetermined minimum, a thermostatic control means responsive to outdoor temperature, said control means comprising a plurality of thermostatic switches respectively connected in series with respective used capacity determining devices of the heat exchanger means, means to relatively adjust said switches so that the same respectively respond to different successive ranges of outdoor temperature drop, whereby to selectively condition said capacity determining devices for operation, and said outdoor thermostatic control means including an additional thermostatic switch, responsive to extreme low outdoor temperature, connected with the electrical means for governing the operation of the heat generating source so as to by-pass the thermostatic selector devices of the heat exchanger means.

3. In a building heating system according to claim 2 wherein the electrical means for governing the operation of the heating medium generating source includes room thermostatic means in series with the thermostatic selector devices of the heat exchanger means and also in series with the additional thermostatic switch of the outdoor thermostatic control means.

AMARIAH H. CUBBERLEY.

References Cited in the file of this patent

UNITED STATES PATENTS

| Number | Name | Date |
|---|---|---|
| 1,516,653 | Tregoning | Nov. 25, 1924 |
| 1,883,015 | Shipley | Oct. 18, 1932 |
| 2,080,444 | Stewart | May 18, 1937 |
| 2,140,147 | Vroom | Dec. 13, 1938 |
| 2,153,859 | Armstrong | Apr. 11, 1939 |
| 2,174,558 | Gunther | Oct. 3, 1939 |
| 2,192,859 | Scoggin | Mar. 5, 1940 |
| 2,425,998 | Crise | Aug. 19, 1947 |
| 2,448,776 | Crise | Sept. 7, 1948 |
| 2,527,283 | Vogelsberg | Oct. 24, 1950 |
| 2,549,952 | Wheelock | Apr. 24, 1951 |

FOREIGN PATENTS

| Number | Country | Date |
|---|---|---|
| 536,480 | Germany | Oct. 23, 1931 |
| 537,864 | Germany | Nov. 7, 1931 |